United States Patent
Bungart et al.

(10) Patent No.: US 6,375,172 B1
(45) Date of Patent: Apr. 23, 2002

(54) HYDRAULICALLY-DAMPING ENGINE BEARING

(75) Inventors: Ernst Bungart, Bad Münstereifel; Heinrich Meyer, Königswinter; Jörn-Rainer Quast, Sinzig, all of (DE)

(73) Assignee: Mannesmann Boge GmbH, Bonn (DE)

( * ) Notice: Subject to any disclaimer, the term of this patent is extended or adjusted under 35 U.S.C. 154(b) by 0 days.

(21) Appl. No.: 09/335,582

(22) Filed: Jun. 18, 1999

(30) Foreign Application Priority Data

Jun. 25, 1998  (DE) ......................................... 198 28 311

(51) Int. Cl.⁷ ............................. F16F 5/00; F16F 9/348
(52) U.S. Cl. ........................... 267/140.13; 267/140.14; 267/140.15
(58) Field of Search ...................... 267/140.11, 140.13, 267/140.14, 140.15, 140.5, 141.1, 292, 294; 248/562, 636

(56) References Cited

U.S. PATENT DOCUMENTS

| | | | | |
|---|---|---|---|---|
| 4,697,794 A | * | 10/1987 | Brenner et al. ............. 267/195 |
| 4,880,215 A | * | 11/1989 | Katayama et al. ........ 267/140.1 |
| 4,886,251 A | * | 12/1989 | Haussermann ........... 267/140.1 |
| 5,330,164 A | * | 7/1994 | Takano et al. .......... 267/140.14 |
| 5,370,375 A | * | 12/1994 | Kojima ................... 267/140.14 |
| 5,386,977 A | * | 2/1995 | Quast .................... 267/140.13 |
| 5,393,041 A | * | 2/1995 | Takano et al. .......... 267/140.14 |
| 5,443,574 A | * | 8/1995 | Ohtake et al. .......... 267/140.14 |
| 5,492,311 A | * | 2/1996 | Kurr et al. .............. 267/140.13 |
| 5,632,472 A | * | 5/1997 | Kato et al. ............. 267/140.13 |
| 5,639,073 A | * | 6/1997 | Suzuki et al. .......... 267/140.13 |
| 5,762,295 A | * | 6/1998 | McGuire et al. .............. 244/54 |
| 5,779,231 A | * | 7/1998 | Okazaki et al. ......... 267/140.14 |
| 5,950,994 A | * | 9/1999 | Hosoya et al. ......... 267/140.13 |
| 5,979,883 A | * | 11/1999 | Mizutani et al. ....... 267/140.13 |
| 5,992,833 A | * | 11/1999 | Tanahashi .............. 267/140.14 |

FOREIGN PATENT DOCUMENTS

| | | | |
|---|---|---|---|
| JP | 4122841 U | * | 11/1992 |
| JP | 6137360 A | * | 5/1994 |
| JP | 6137362 A | * | 5/1994 |
| JP | 6185568 A | * | 7/1994 |
| WO | 9617184 | * | 6/1996 |

OTHER PUBLICATIONS

Mason, Frederick of Thomson Corporation Co., Oct. 1989, American Machinist vol. 133 No. 10 p. 84.*

* cited by examiner

*Primary Examiner*—Robert J. Oberleitner
*Assistant Examiner*—Melody M. Burch
(74) *Attorney, Agent, or Firm*—Cohen, Pontani, Lieberman & Pavane

(57) ABSTRACT

A hydraulically-damping engine bearing includes a restrictedly deflectable diaphragm separating first and second fluid-filled primary chambers that are bordered at least partially by elastic walls. At least one channel is connected between the first and second primary chambers. An arrangement is connected for adjusting a characteristic of the bearing. The arrangement includes an auxiliary suspension spring that, with the wall of one of the chambers, forms an auxiliary chamber, whereby one of the primary chambers is connectable to the auxiliary chamber via a controllable flow connection.

9 Claims, 2 Drawing Sheets

HYDRAULICALLY-DAMPING ENGINE BEARING

BACKGROUND OF THE INVENTION

1. Field of the Invention

The invention relates to a hydraulically damping engine bearing with restrictively deflectable diaphragms separating fluid-filled chambers bordered at least partially by elastic walls and with at least one channel connecting the chambers, whereby the damping characteristics of the bearing are adjustable by an adjustment arrangement.

2. Description of the Related Art

Prior art hydraulically damping engine bearings in which a separating wall is arranged between two chambers are known (e.g., DE 34 46 725 C2) wherein one chamber has an elastic diaphragm running in annular fashion around the outer wall. In this case, the intermediate space formed between the elastic diaphragm and the rigid outer wall can be pressurized with an underpressure for the purpose of attaining high rigidity of the engine bearing. To change the bearing characteristic to "hard" during driving operation, it is necessary to apply an underpressure to the intermediate space, so that the elastic wall rests directly on the outer wall of the bearing.

Further prior art engine bearings are known (e.g., DE 42 38 752 C1) in which chambers separated by a diaphragm are equipped, for the purpose of changing the bearing characteristic, with a flexible wall arranged in one of the chambers. At a low rigidity of the bearing, the bearing characteristic is changed by virtue of at least one of the hydraulic chambers working against a gas volume enclosed in an intermediate space. At a high rigidity of the bearing, the flexible wall comes at least partially to rest on a stop. To aerate the intermediate space, a switch opens a flow connection to the atmosphere or releases a pressure storage device, while de-aeration of the intermediate space occurs via a valve in the flow connection. In this design, the flexible wall is a direct component of the complete rubber bearing.

In addition, there are prior art rubber bearings that, although they are embodied with controllable rigidity and relate to conventional bearings (e.g., DE 41 14 879 A1, DE 41 20 841 C1, DE 41 30 362 C2 and DE 41 03 028 C2), require auxiliary energy in the form of pressurized air or hydraulic pressure. The device shown in FIG. 4 of DE 41 30 362 C2 is equipped with a mechanical adjustment device.

Another prior art hydraulically-damping engine bearing with a conventional suspension spring (e.g., WO 96/17184) connected in series is also known. However, the conventional suspension spring is placed out of operation in the hard position. For this purpose, in addition to an expensive circuit module, auxiliary energy in the form of pressure is needed.

SUMMARY OF THE INVENTION

The object of the invention is to create a hydraulically-damping engine bearing that insulates the engine stimuli, especially in idle, and is controllable for additionally decreasing the static and dynamic rigidity level.

To attain this object, the arrangement according to the invention comprises a bearing having first and second primary chambers and an auxiliary suspension spring that forms, with the controllable flow connection, a closed or open auxiliary chamber that is connectable to the first primary chamber.

It is advantageous that, because of the auxiliary suspension spring, a serial connection is established by the engine bearing together with the actual elastic walls. The auxiliary suspension spring contains an auxiliary chamber that is connected to the first primary bearing chamber via the flow connection. In the open state of the flow connection, the damping fluid is pumped without dynamic resistance from the auxiliary chamber to the first primary chamber and back, so that the static spring rate of the auxiliary suspension spring comes into effect for attaining the "soft" position.

When the flow connection is closed, a substantially larger expansion spring rate of the auxiliary spring comes into effect, and the "hard" position is established.

According to a further essential feature, one of the first and second primary bearing chambers is a compensating chamber having a compensating diaphragm. It is advantageous that, given suitable arrangement of the auxiliary chamber and of the working chambers embodied on both sides of the primary bearing chamber having the compensating diaphragm, a design is created in which the compensating chamber is effective for both the first and second primary chambers.

In a further embodiment, the first primary chamber interacting with the auxiliary chamber has the compensating diaphragm.

A simple-to-produce embodiment is created when the wall separating the auxiliary chamber from the adjacent first primary chamber comprises the flow connection. Advantageously, the cross-section of the flow connection can be modified by at least two parts movable relative to each other.

In a further advantageous embodiment, the two movable parts comprise disks equipped with openings that correspond with each other.

In a further embodiment, the flow connection can be influenced via a control device arranged outside of the engine bearing. Advantageously, a servomotor is provided as the control device.

To influence the flow connection, according to an advantageous embodiment, the servomotor moves via a rotary drive at least one of the two movable parts so that the two movable parts move relative to each other.

In a further embodiment, the auxiliary suspension spring has a different rigidity than the elastic wall of the chambers. Advantageously, thanks to the serial connection of the suspension spring, a soft total spring rate comes into effect in the axial and radial directions.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

In the drawings, wherein like reference characters denote similar elements throughout the several views.

DETAILED DESCRIPTION OF THE PRESENTLY PREFERRED EMBODIMENTS

Figure 1:
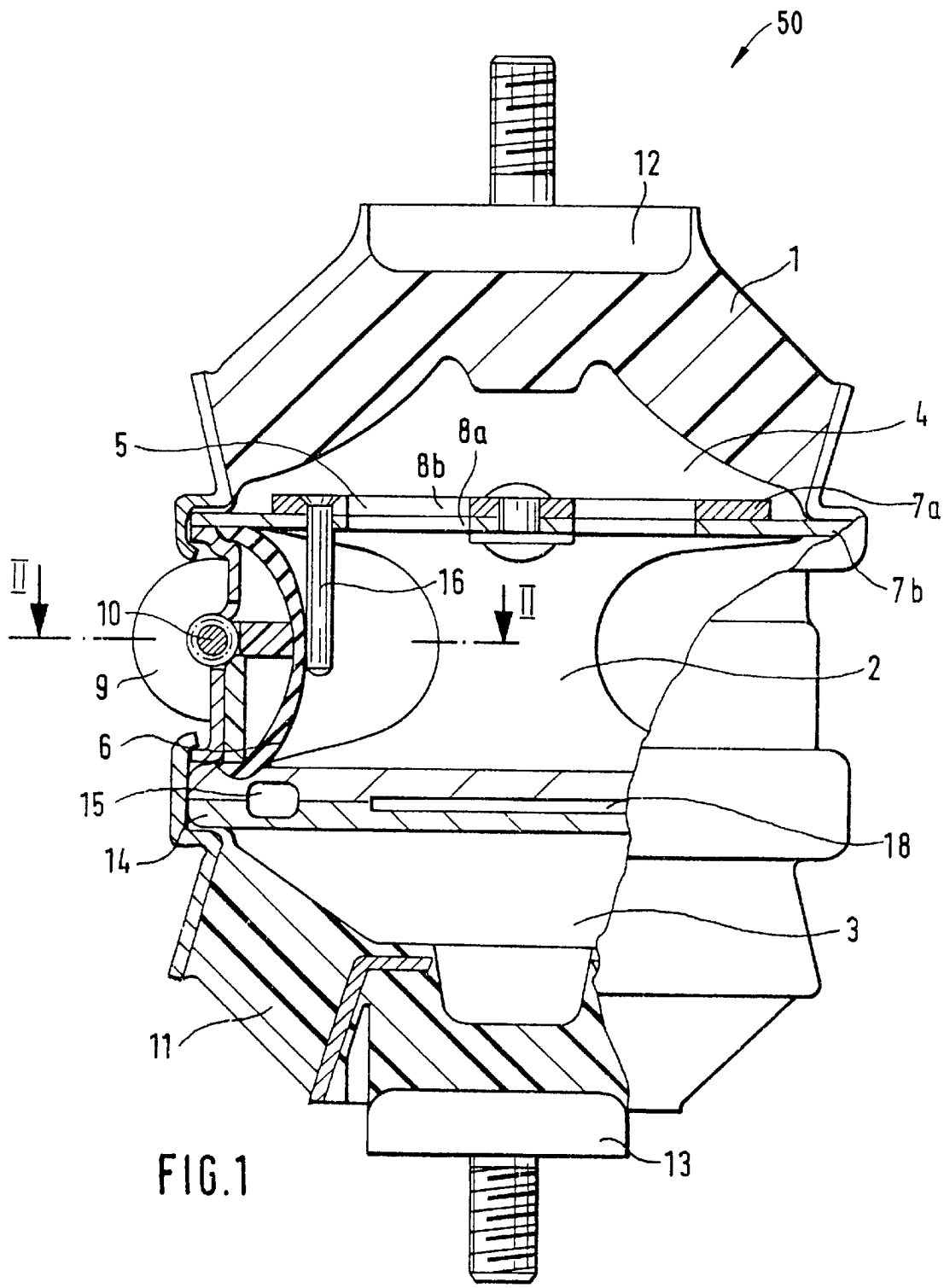
FIG. 1 is a sectional view of an engine bearing with an auxiliary suspension spring according to an embodiment of the present invention.

The hydraulically damping engine bearing 50 shown in FIG. 1 comprises attachment parts 12 and 13 and an elastic wall 11 extending around the circumference. The, engine bearing 50 further comprises first and second primary chambers 2 and 3 filled with a damping medium and separated from each other by a separating wall 14. The separating wall 14 may optionally contain a decoupling diaphragm 18. The first primary chamber 2 and the second primary chamber 3 are connected via a choke tube 15. The first primary chamber 2 is embodied as a compensating space, in that a compensating diaphragm 6 is provided running around the circumference of the first primary chamber 2.

The above-described elements constitute a conventional hydraulically-damping engine bearing.

An auxiliary chamber 4 is arranged on a side of the first primary chamber 2 opposite to the second primary chamber 3 (embodied as the working chamber). One side of the auxiliary chamber 4 is bordered by an auxiliary suspension spring 1 and another side is bordered by a movable part 7a and clamped plate 7b. A flow connection 5 is arranged between the first primary chamber 2 and the auxiliary chamber 4. The flow connection 5 is implemented by openings 8a and 8b in the movable part 7a and the clamped plate 7b respectively.

In the example shown in FIG. 1, the movable parts 7a and clamped part 7b are rotatable relative to each other. As a result of the relative rotation, the openings 8a and 8b are able to vary the cross-section of the flow connection 5 in the manner of an aperture from "completely closed" to "completely open." In the "completely open" position, when there is damping medium compensation between the auxiliary chamber 4 and the chamber 2, practically no damping or dynamic hardening is produced.

When the flow connection 5 is open and high-frequency vibrations are introduced in the attachment part 12, the compensating diaphragm 6 of the first primary chamber 3 undertakes the decoupling, i.e., the elimination, of the high-frequency vibrations in the second primary chamber 2 without damping fluid making its way via the choke tube 15 into the second primary chamber 3.

Upon introduction of low-frequency vibrations via the attachment part 12, the damping fluid is pumped out of the auxiliary chamber 4 via the first primary chamber 2 and the choke tube 15 into the second primary chamber 3 and back again.

When the flow connection 5 is closed, the damping medium from the auxiliary chamber 4 is no longer available, and the chambers 2 and 3 work on the principle of a conventional hydraulically damping engine bearing.

In the embodiment of FIG. 1, the flow connection 5 is controlled by a control device 9, which, via a rotary drive 10, moves a pin 16 in the circumferential direction, and thus moves the two movable parts 7a and 7b relative to each other. The control device 9 may comprise a servomotor.

Figure 2:
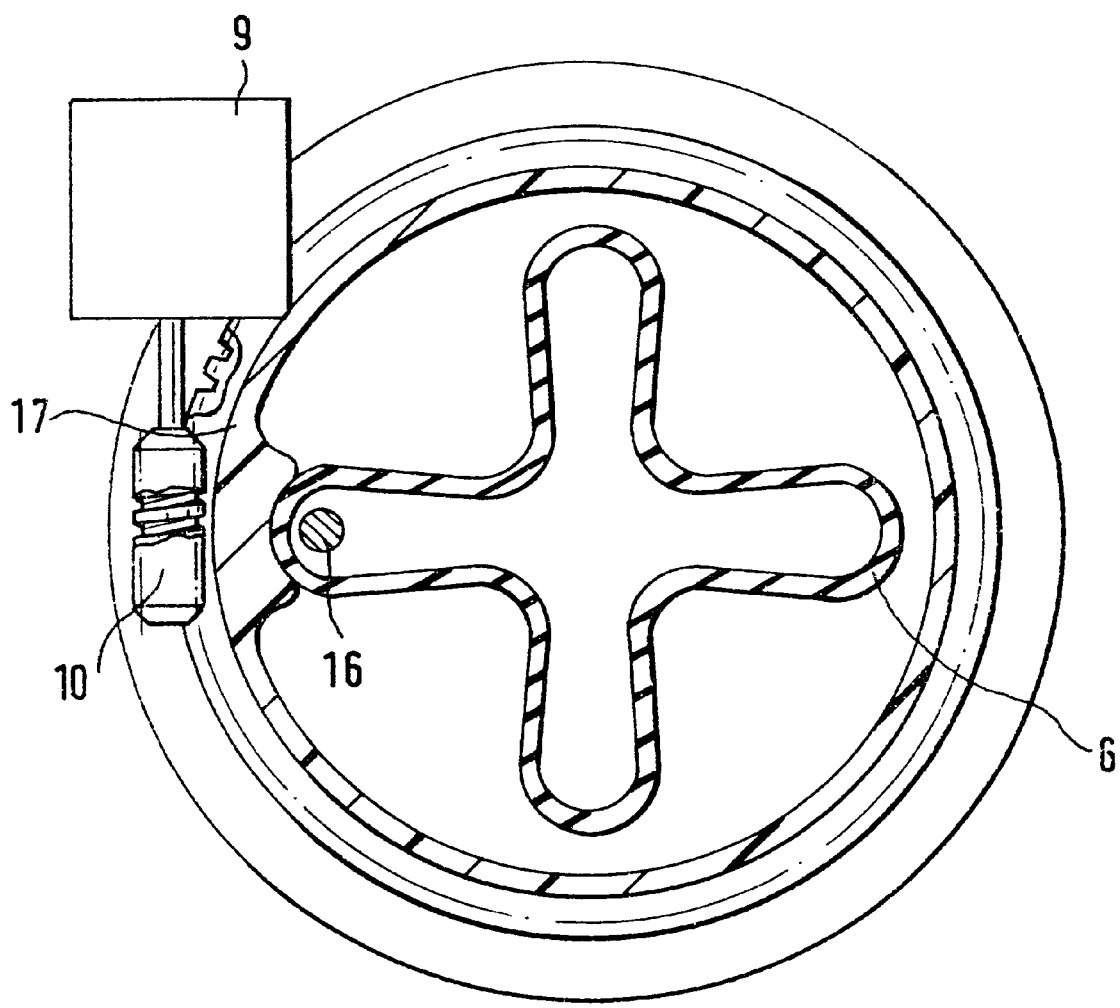
FIG. 2 is a cross-sectional view II—II of the engine bearing in FIG. 1 through the chamber containing the compensating diaphragm.

As shown in FIG. 2, the pin 16 is pressurized by the rotary drive 10 via a catch 17. The compensating diaphragm 6 passes between the pin 16 and the catch 17. Therefore, no additional seal is required between the pin 16 and the atmosphere.

The invention is not limited by the embodiments described above which are presented as examples only but can be modified in various ways within the scope of protection defined by the appended patent claims.

We claim:

1. A hydraulically-damped engine bearing, comprising:

first and second primary chambers filled with a fluid, wherein at least one of said first and second primary chambers is at least partially bordered by elastic walls;

a first separating wall having a restrictively deflectable diaphragm arranged between said first and second primary chambers and a channel connecting said first and second primary chambers; and an arrangement for adjusting a bearing characteristic of said engine bearing including an auxiliary suspension spring forming an auxiliary chamber connectable to said first primary chamber and a flow connection controllable for selectively connecting and disconnecting said auxiliary chamber and said first primary chamber, wherein said elastic walls of said at least one of said first and second primary chambers are serially connected with said auxiliary suspension spring when said auxiliary chamber is connected to said first primary chamber, wherein said arrangement for adjusting a bearing characteristic further comprises a wall that separates said auxiliary chamber from said first primary chamber, said second separating wall comprising said flow connection.

2. The engine bearing of claim 1, wherein one of said first and second primary chambers comprises a compensating diaphragm.

3. The engine bearing of claim 2, wherein said first primary chamber comprises said compensating diaphragm.

4. The engine bearing of claim 1, wherein said second separating wall further comprises two parts movable relative to each other for varying a cross-section of said flow connection.

5. The engine bearing of claim 4, wherein said movable parts comprise disk-shaped objects with corresponding openings.

6. The engine bearing of claim 1, further comprising a control device connected to said flow connection for opening and closing said flow connection.

7. The engine bearing of claim 6, wherein said control device comprises a servomotor.

8. The engine bearing of claim 1, wherein said arrangement for adjusting a bearing characteristic further comprises two disk-shaped parts movable relative to each other and having corresponding openings for varying a cross-section of said flow connection and a control device connected for opening and closing said flow connection, said control device comprising a servomotor connected to a rotary drive for moving at least one of said two disk-shaped parts relative to the other of said two disk-shaped parts.

9. The engine bearing of claim 1, wherein said auxiliary suspension spring has a different rigidity than said elastic walls of at least one of said first and second primary chambers.

* * * * *